United States Patent [19]
Merbold

[11] Patent Number: 5,374,167
[45] Date of Patent: Dec. 20, 1994

[54] FEED PUMP FOR A HYDRAULIC SYSTEM

[75] Inventor: Dirk Merbold, Eppingen, Germany

[73] Assignee: Robert Bosch GmbH, Stuttgart, Germany

[21] Appl. No.: 177,816

[22] Filed: Jan. 4, 1994

[30] Foreign Application Priority Data

Mar. 5, 1993 [DE] Germany .............................. 4306921

[51] Int. Cl.⁵ .................................................. F04B 7/00
[52] U.S. Cl. ................................. 417/446; 137/316; 137/539
[58] Field of Search ............... 417/446, 455, 569; 137/316, 539

[56] References Cited

U.S. PATENT DOCUMENTS

| | | | |
|---|---|---|---|
| 865,151 | 9/1907 | Andrew | 417/446 |
| 3,771,908 | 11/1973 | Rosen | 417/446 |
| 5,123,819 | 6/1992 | Schuller et al. | 417/569 |

FOREIGN PATENT DOCUMENTS 0297547  3/1951  Italy ................................ 417/446

Primary Examiner—Richard A. Bertsch
Assistant Examiner—M. Kocharov
Attorney, Agent, or Firm—Edwin E. Greigg; Ronald E. Greigg

[57] ABSTRACT

A feed pump for a hydraulic system that is equipped with at least one outlet valve whose valve-closing body is loaded by a valve spring. The valve-closing body is held at a distance form its valve seat by means of a gas-filled hollow-body ring so that the feed pump can be evacuated through its outlet valve for subsequent filling with a hydraulic pressure medium. With a first increase in pressure in the system, the hollow-body ring is pressed together, so that the valve-closing body slips through the hollow-body ring and reaches its valve seat, thus making the outlet valve operational. The feed pump is suitable for use as a return pump for anti-skid systems of hydraulic brake systems.

23 Claims, 6 Drawing Sheets

FEED PUMP FOR A HYDRAULIC SYSTEM

The invention is based on a feed pump for a hydraulic system as set forth hereinafter.

BACKGROUND OF THE INVENTION

A feed pump of this type is known from European Patent Application EP 0 446 454 A1, for example. When such feed pumps are installed into a hydraulic system, the problem arises that the system, along with the feed pumps, must be extensively evacuated before being filled with a hydraulic pressure medium to assure the highest possible filling capacity with the hydraulic pressure medium, and thus total effectiveness of the system. Air that may have dissolved in the hydraulic pressure medium causes an elasticity in the pressure medium that is undesirable because of a resilience of the pressure medium column that conveys the pressure. Air bubbles or gas bubbles contained in the system are particularly disadvantageous. This applies especially to hydraulic brake systems, which only operate reliably when free from air bubbles.

With a known feed pump, when the pump is not in use, the valve-closing body is held fixedly and tightly on its valve seat by the valve spring. For instance, the valve spring is embodied such that more than 1 bar, and preferably approximately 6 bar, are required to open the outlet valve. This practically excludes the evacuation of the work cylinder of the pump. Post-evacuation filling of the system with a pressure medium coming from a reservoir of a main brake cylinder, for example, is not permitted with the use of a feed pump of this type.

OBJECT AND SUMMARY OF THE INVENTION

The object of the invention, therefore, is to avoid this disadvantage and also to permit the filling of the feed pump during the first filling of the system, the so-called "evacuation filling."

This object is attained in accordance with the invention, with the feed pump mentioned at the outset, by means of the features set forth herein.

An additional advantage of the feed pump of the invention is that an increase in pressure during the feed cycle of the pump is damped because of the flexible compressibility of the ring.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
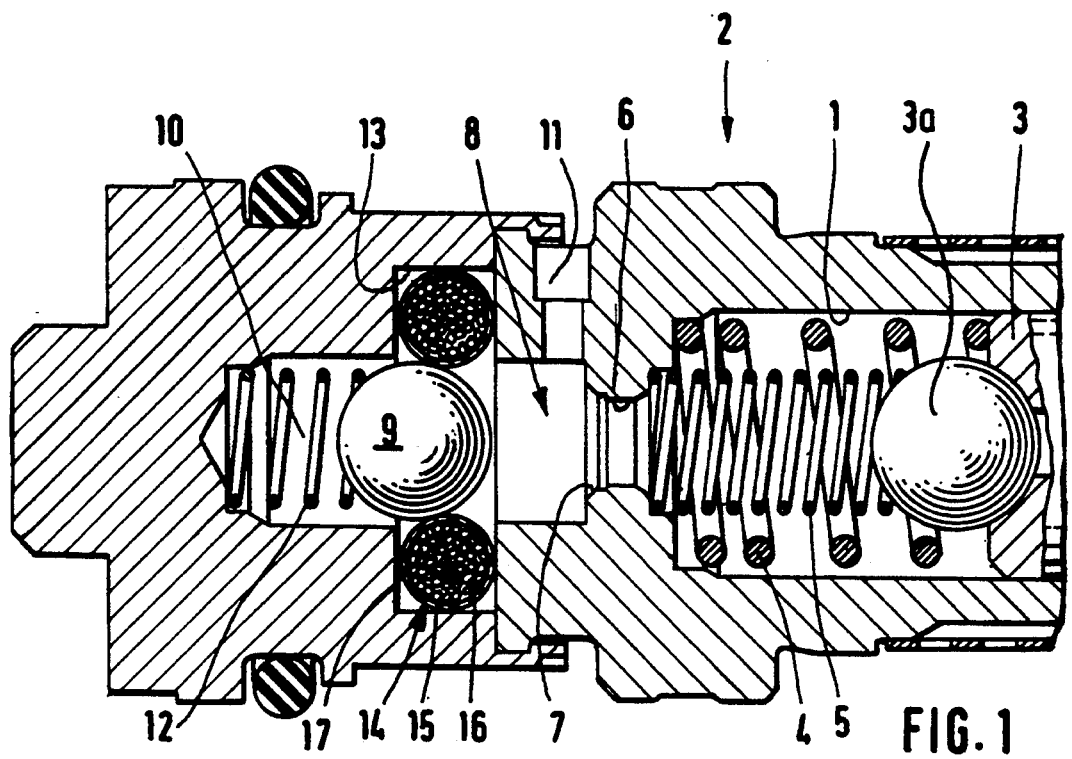
FIGS. 1 and 2 show a first design in the assembly position and in the later working position.

FIG. 1 shows a work cylinder 1 of a feed pump 2 for use in a hydraulic anti-lock brake system, for example, whose further individual parts are not shown. The work cylinder 1 is defined on its right side in FIG. 1 by a pump piston 3 constituting a movable wall. This pump piston is loaded by two nested restoring springs 4 and 5, and a valve ball 3a is located between the restoring spring 5 and the pump piston 3. A valve seat 7 of an outlet valve 8 is provided on the other end of the work cylinder 1 adjacent to a narrowed passage 6; the valve-closing body 9 of the outlet valve is a ball that is shown in the representation of FIG. 1 at a great distance from its valve seat 6, that is, the outlet valve 8 is open, and is not yet ready to function, as shown in FIG. 1.

The valve-closing body 9 is disposed in a chamber 10 connected downstream of the valve seat 7 to a radially extending discharge conduit 11 for the hydraulic pressure medium. A valve spring 12 is disposed in the chamber 10 that acts on the valve-closing body 9 in the closing direction of the outlet valve 8.

An annular groove-type recess 13, into which a hollow-body ring 14 is inserted with a slight radial prestress, follows the chamber 10. The prestress is necessary to obtain a defined decrease in volume essentially in the radial direction, as will be described later. The hollow-body ring 14 is preferably made of plastic, such as polyethylene. It has a closed casing surface 15 that encompasses an interior space 16 filled with a plurality of likewise plastic-encased gas bubbles 17. Air, nitrogen or any propellant known in the processing of plastic can be used as the gas. FIG. 1 illustrates the valve closing body 9 in a pre-shipped, pre-installed position for securing the valve in a brake system.

Before the first filling of the valve with a pressure medium after it is installed in a brake system, the system is evacuated through an opening. This opening can be the filling opening of a reservoir of a main brake cylinder, for example. At the time filling is to be executed, the hydraulic pressure medium, in the present case brake fluid, is allowed to flow into the system through this opening. This brake fluid travels through the discharge conduit 11 into the chamber 10 and, from there, through the held-open outlet valve 8 and through the passage 6 into the work cylinder 1 of the feed pump 2.

The pressure medium can also flow into the feed pump 2 between the pump piston 3 and the valve ball 3a, for example.

Figure 2:
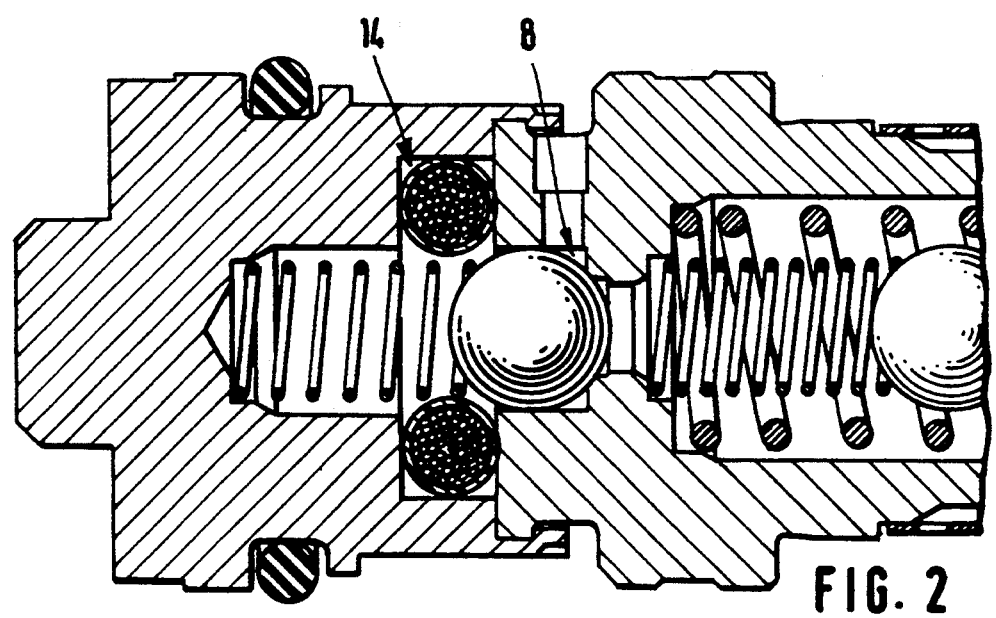

To activate the outlet valve 8, a pressure at a level of 50 bar, for example, must be generated in the system by means of a first application of brakes via operation of the foot pedal of a master brake cylinder, not shown. This pressure causes a volume compression of the gas filling in the hollow-body ring 14 (compression) and thus a compression of its inside diameter in such a way that the valve-closing body 9 of the outlet valve 8 can pass through the hollow-body ring 14, and then reaches its valve seat 7 under the force of the valve spring 12, as shown in FIG. 2. The brake pressure from the master brake cylinder will force the brake fluid into the opening 11, which will build up the fluid pressure in the work chamber 2 and in the area between the valve-closing body 9 and the hollow-body ring 14. Since the hollow-body ring 14 is formed of a compressible material, the pressure on the inner diameter area will compress the hollow body toward the groove wall. When the inner diameter of the hollow-body ring has been compressed sufficiently thereby enlarging the inner diameter, brake fluid will flow between the compressed hollow-body ring 14 and the valve-closing body 9. When the chamber 10 fills with brake fluid, the fluid pressure on all sides of the valve closing body will be equal and the spring 12 will force the valve-closing body 9 through the inner diameter of the compressed hollow-body ring to be seated on the valve seat 7. The spring 12 will move the valve-closing body to the valve seat by the spring force because the fluid pressure on the valve-closing body will be equal on all sides. Only now are the outlet valve 8 and the feed pump 2 operational and, after activation, the feed pump 2 can pump a pressure medium in the direction toward the main brake cylinder, for example.

The starting pressure at which the valve-closing body slides through the hollow-body ring 14 is a function of, among other things, the gas component in the ring 14 and the thickness of its casing 15, i.e., the total volume elasticity; the force of the valve spring 12 is less significant.

It is to be noted that it becomes possible in a very simple manner to hold open the outlet valve 8 for the first filling, and that the system is fully operational after a first application of brakes.

The hollow-body ring 14, which breathes with changes in pressure, also forms a damping element, thus preventing disadvantageous pressure shocks in the system, such as when the feed pump 2 is operating.

FIGS. 3 through 8 relate to feed pumps 18, 19, 20, which are embodied identically to the feed pump 2 in FIGS. 1 and 2, except for a different valve-closing body. The same parts therefore have the same reference numerals.

Figure 3:
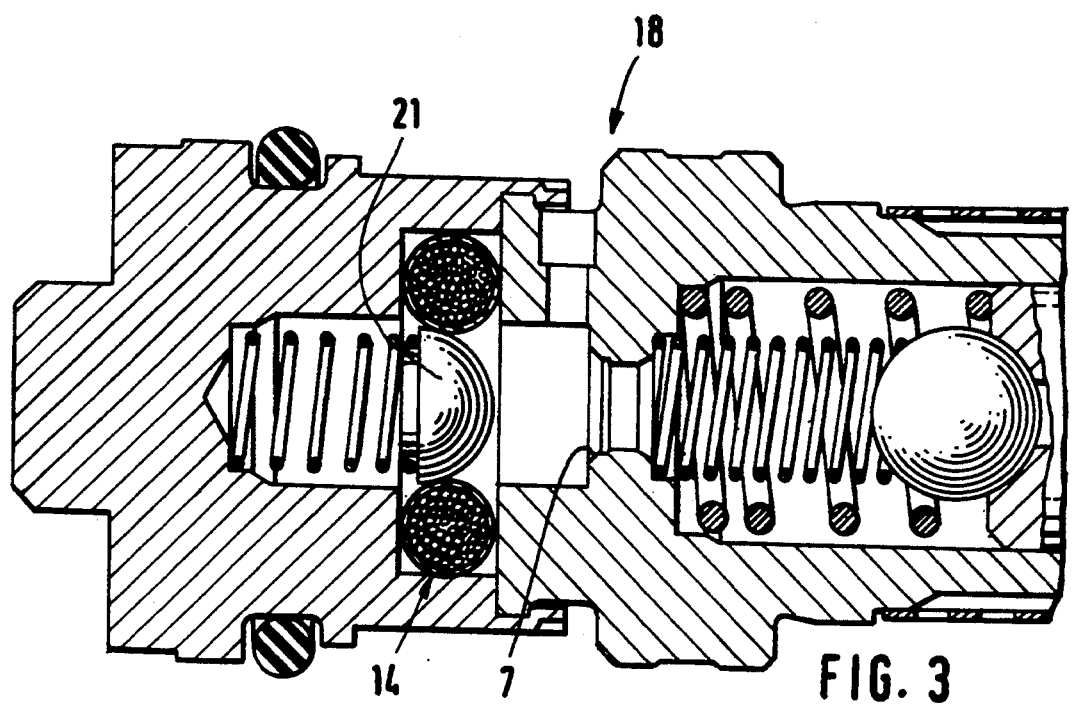
FIGS. 3 and 4 show a second design in the assembly position and working position.
Figure 4:
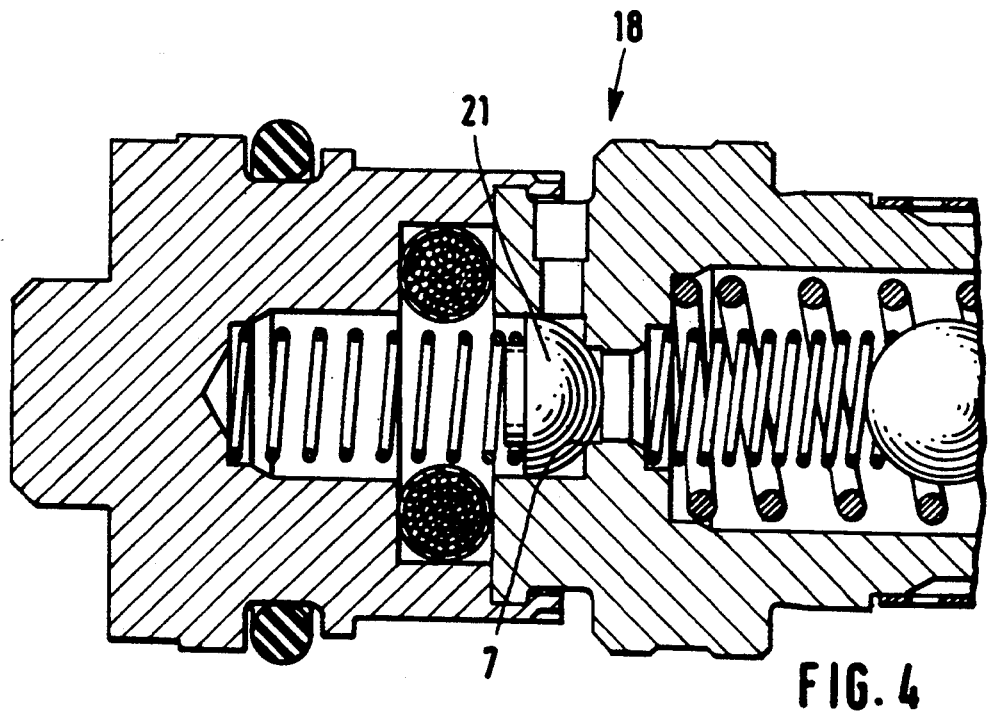

The feed pump 18 in FIGS. 3 and 4 has a semi-spherical valve-closing body 21 that cooperates with the hollow-body ring 14 and the valve seat 7. The mode of operation of this exemplary embodiment is identical to that shown in FIGS. 1 and 2.

Figure 5:
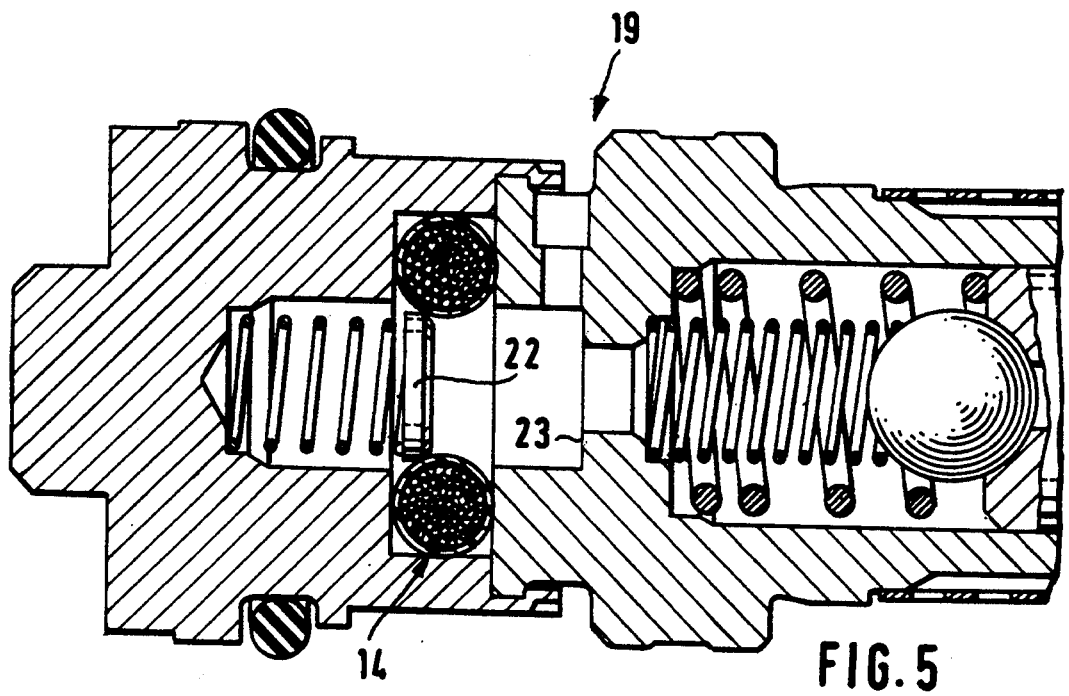
FIGS. 5 and 6 show a third design in the assembly position and working position.
Figure 6:
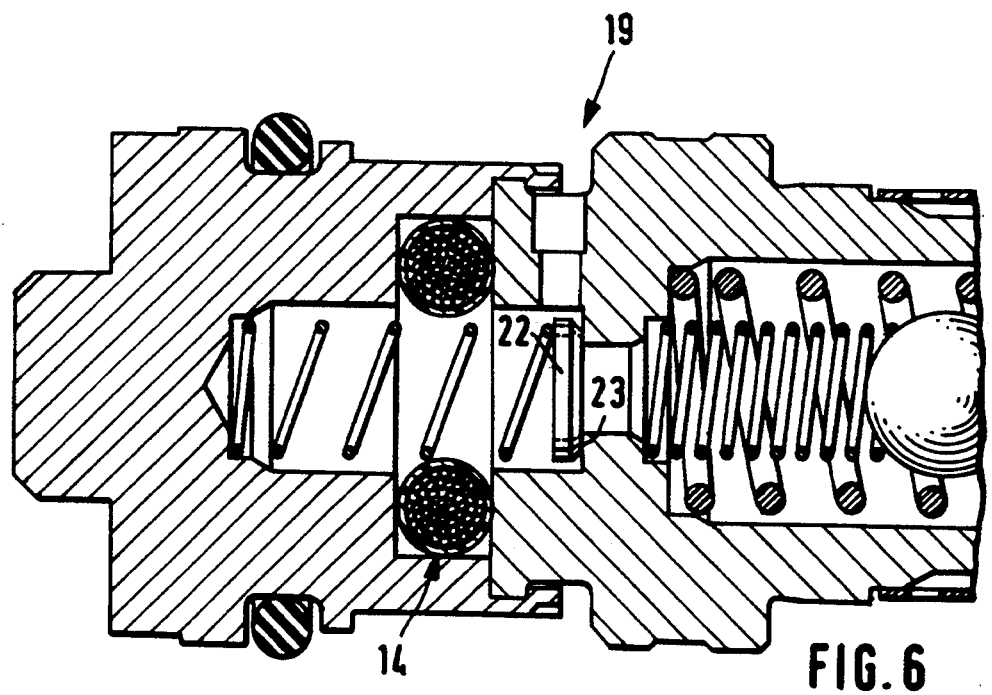

The feed pump 19 in FIGS. 5 and 6 has a plate-shaped valve-closing body 22 that likewise cooperates with the hollow-body ring 14, but with a flat valve seat 23. The mode of operation of this exemplary embodiment is therefore identical to that of the exemplary embodiment shown in FIGS. 1 and 2, as well as in 3 and 4.

Figure 7:
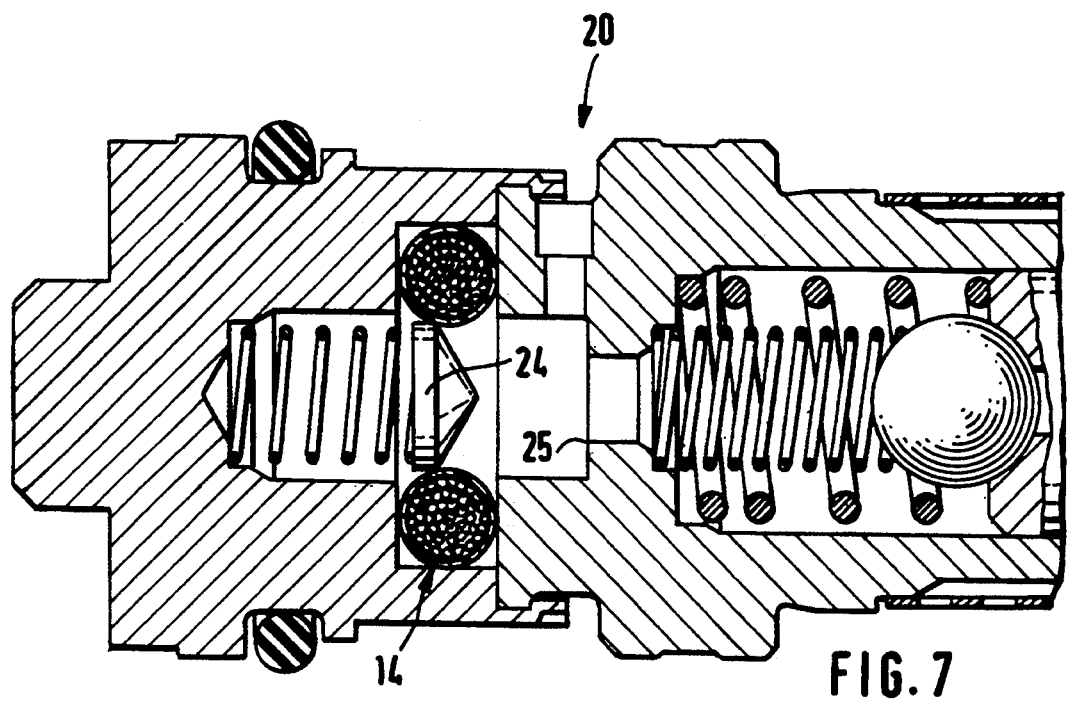
FIGS. 7 and 8 show a fourth design in the assembly position and working position.
Figure 8:
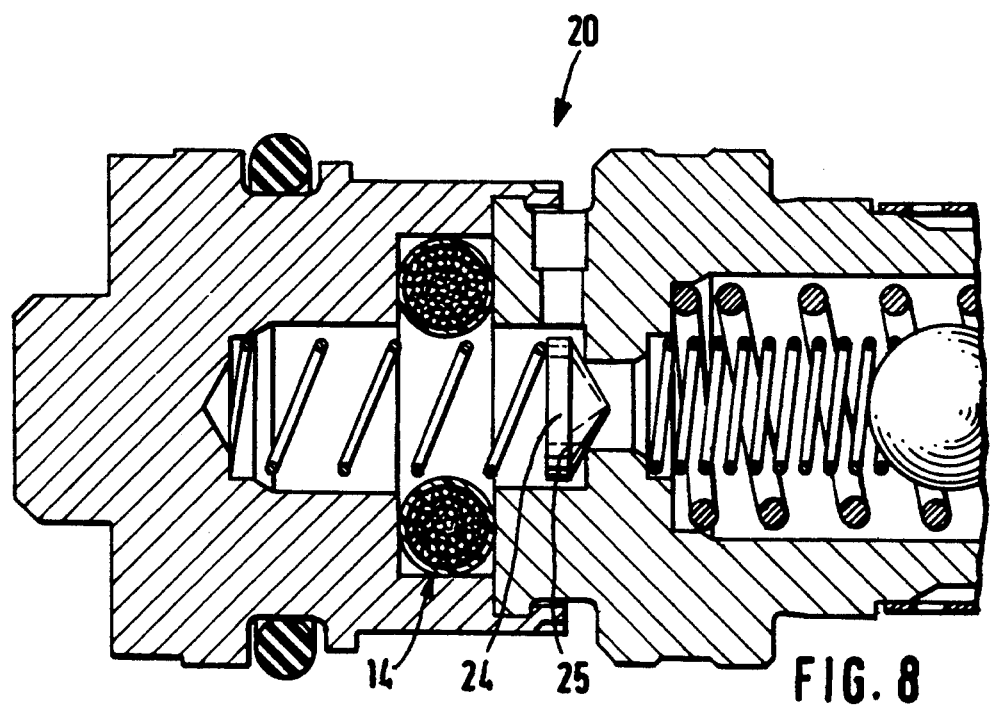

The feed pump 20 in FIGS. 7 and 8 has a conical valve-closing body 24 that cooperates with a valve seat 25 that has annular edges. The mode of operation of this exemplary embodiment is likewise identical to those in FIGS. 1 through 6.

Figure 9:
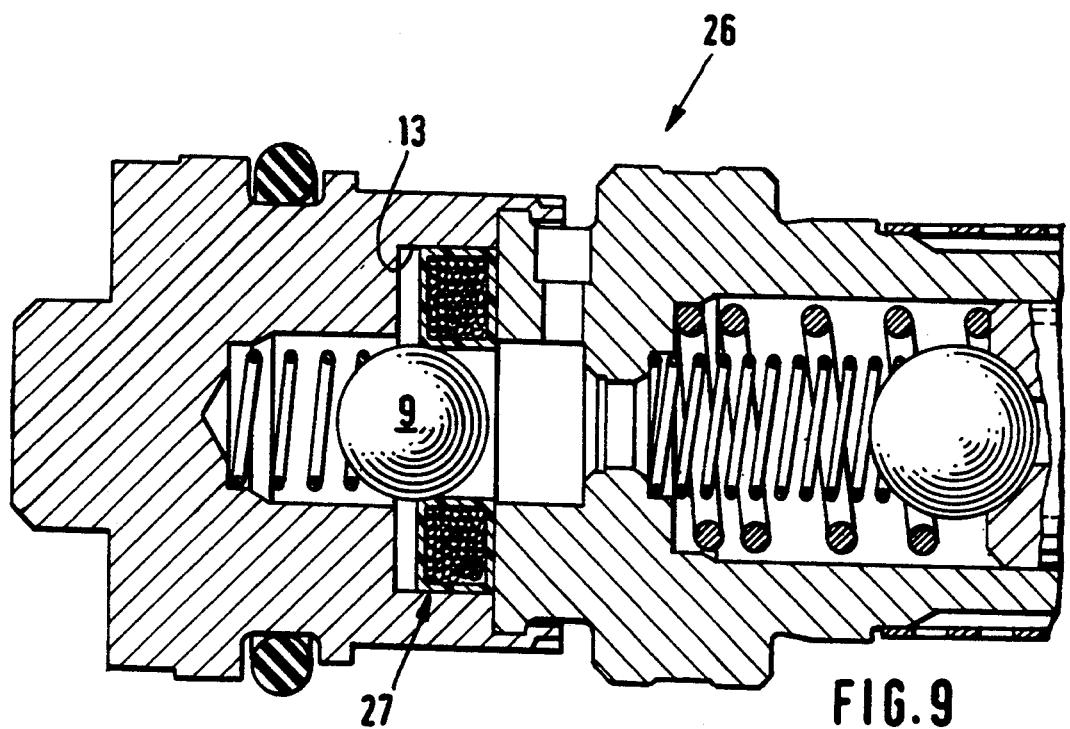
FIGS. 9 and 10 show a fifth design, likewise in the assembly position and working position; and finally.
Figure 10:
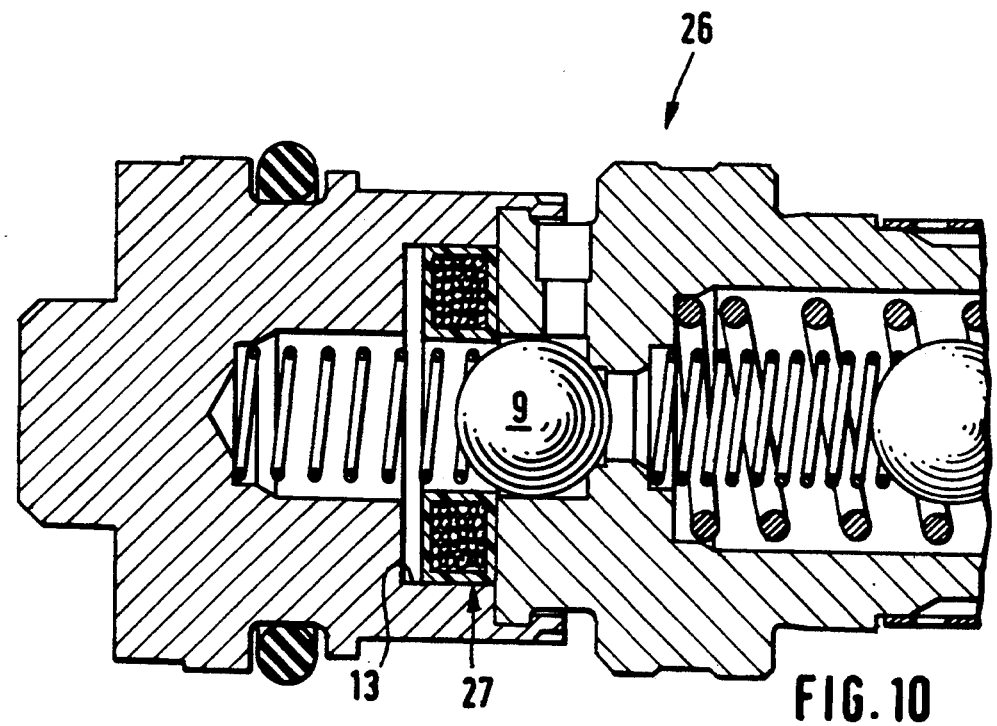

The exemplary embodiment in FIGS. 9 and 10 is derived from the one in FIGS. 1 and 2. In this case a feed pump 26 is shown that likewise has a spherical valve-closing body 9. However, in this case a hollow-body ring 27 is embodied with a rectangular cross-section and inserted into the annular groove-type recess 13. The mode of operation of this exemplary embodiment corresponds to that in FIGS. 1 and 2; this is also true with respect to hydraulic damping.

In tests involving the hollow-body ring 27, it has been shown that the commercially available plastic material Alveolit TA 0504 with product number 95 227, manufactured by the Alveo AG company, Bruchstrasse 69, CH-6003 Lucern, Switzerland, has the most advantageous characteristics up to now. Alveolit is a polyethylene cross-linked in a closed, linear manner.

Figure 11:
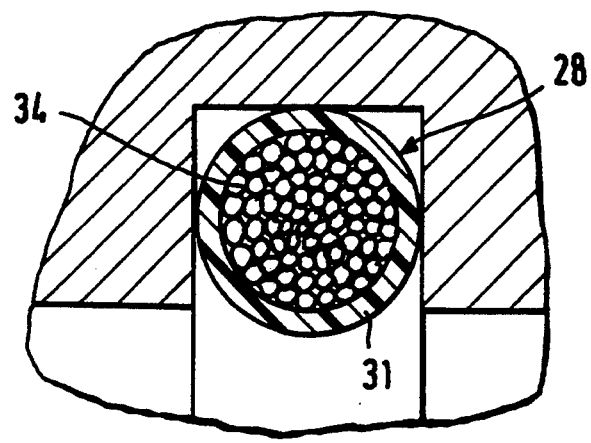
FIGS. 11, 12 and 13 represent three further exemplary embodiments of the invention.
Figure 12:
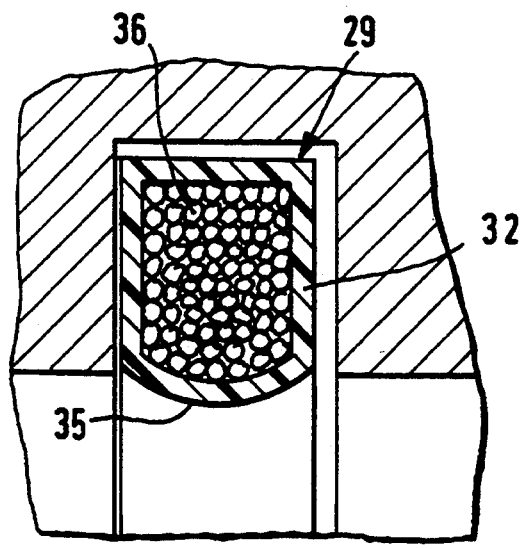
Figure 13:
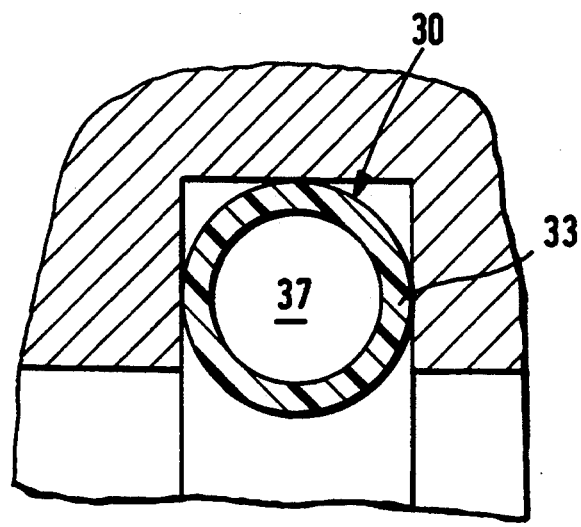

FIGS. 11, 12 and 13 show three further exemplary embodiments of a hollow-body ring. The exemplary embodiments have a casing 31, 32, 33 of pure ethylene propylene diene caoutchouc. A hollow-body ring 28 is circular in cross-section and has a filling 34 comprising EPDM plastic with bubbles. A hollow-body ring 29 is rectangular in cross-section, and an inside surface 35 forming the inner diameter of the ring 29 is convex. The hollow-body ring 29 also has a filling 36 of EPDM plastic with air bubbles or propellant bubbles.

Finally, a hollow-body ring 30 has only the casing 33. Its interior is filled with air or gas, preferably with nitrogen. It is to be noted that the hollow-body rings 28, 29 and 30 can also be used in feed pumps, as shown in FIGS. 1 through 10.

Although the subject of the invention is only described in connection with a feed pump 2 for an anti-lock brake system, it is obvious that it can also be used in other hydraulic systems that must be filled for the first time with a hydraulic pressure medium after assembly, and with which a so-called "evacuation filling" is also used.

Hydraulic vehicle steering systems, hydraulic tools, presses and other hydraulic systems are also conceivable in this sense.

The concept of the invention described by means of outlet valves can also be applied as needed to other valves, such as intake valves that are closed by valve springs.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A feed pump for a hydraulic system, said feed pump having a work cylinder, a pump piston (3) in said work cylinder, a chamber (10), and at least one outlet valve in said chamber, wherein the outlet valve has a valve seat (7), a valve-closing body (9) and a valve spring (12), and the valve-closing body is movable inside said chamber, an annular groove-type recess (13) in said chamber (10) into which an elastically compressible hollow-body ring (14, 27, 28, 29, 30) is inserted, the inside diameter of said elastically compressible hollow-body ring in an unpressurized system is smaller than an outside diameter of the valve-closing body (9, 21, 22, 24) for holding said valve-closing body in an open position at a distance from said valve seat, and upon a first pressurization of said hydraulic system by a pressure medium said elastically compressible hollow-body ring experiences a volume compression that compresses the inside diameter of said elastically compressible hollow-body ring toward an outside diameter, and by means of the pressure of the pressure medium said valve closing body (9) is forced by a spring onto the valve seat (7).

2. The feed pump as defined by claim 1, in which the hollow-body ring (14, 27, 28, 29, 30) is inserted into the annular groove-type recess (13) with a radial prestress.

3. The feed pump as defined by claim 2, in which the hollow-body ring (14, 28, 30) is circular in cross-section.

4. The feed pump as defined by claim 2, in which the hollow-body ring (27, 29) is mostly rectangular in cross-section.

5. The feed pump as defined by claim 4, in which an inside surface (35) of the ring that forms the inside diameter of the hollow-ring body (29) is convex.

6. The feed pump as defined by claim 2, in which the hollow-body ring (14, 27, 28, 29, 30) is made of plastic.

7. The feed pump as defined by claim 6, in which an interior space (16) of the hollow-body ring (14, 27) includes a number of gas bubbles (17).

8. The feed pump as defined by claim 6, in which the hollow-body ring (30) comprises a casing (33) particularly filled with gas.

9. The feed pump as defined by claim 1, in which the hollow-body ring (14, 28, 30) is circular in cross-section.

10. The feed pump as defined by claim 9, in which the hollow-body ring (14, 27, 28, 29, 30) is made of plastic.

11. The feed pump as defined by claim 10, in which an interior space (16) of the hollow-body ring (14, 27) includes a number of gas bubbles (17).

12. The feed pump as defined by claim 10, in which the hollow-body ring (30) comprises a casing (33) particularly filled with gas.

13. The feed pump as defined by claim 1, in which the hollow-body ring (27, 29) is mostly rectangular in cross-section.

14. The feed pump as defined by claim 13, in which an inside surface (35) of the ring that forms the inside diameter of the hollow-ring body (29) is convex.

15. The feed pump as defined by claim 14, in which the hollow-body ring (14, 27, 28, 29, 30) is made of plastic.

16. The feed pump as defined by claim 15, in which an interior space (16) of the hollow-body ring (14, 27) includes a number of gas bubbles (17).

17. The feed pump as defined by claim 15, in which the hollow-body ring (30) comprises a casing (33) particularly filled with gas.

18. The feed pump as defined by claim 13, in which the hollow-body ring (14, 27, 28, 29, 30) is made of plastic.

19. The feed pump as defined by claim 18, in which an interior space (16) of the hollow-body ring (14, 27) includes a number of gas bubbles (17).

20. The feed pump as defined by claim 18, in which the hollow-body ring (30) comprises a casing (33) particularly filled with gas.

21. The feed pump as defined by claim 1, in which the hollow-body ring (14, 27, 28, 29, 30) is made of plastic.

22. The feed pump as defined by claim 21, in which an interior space (16) of the hollow-body ring (14, 27) includes a number of gas bubbles (17).

23. The feed pump as defined by claim 21, in which the hollow-body ring (30) comprises a casing (33) particularly filled with gas.

* * * * *